US 6,675,316 B1

(12) United States Patent
Harper

(10) Patent No.: US 6,675,316 B1
(45) Date of Patent: Jan. 6, 2004

(54) METHOD AND SYSTEM FOR RECOVERY OF THE STATE OF A FAILED CPU/CACHE/MEMORY NODE IN A DISTRIBUTED SHARED MEMORY SYSTEM

(75) Inventor: Richard E. Harper, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 09/615,054

(22) Filed: Jul. 12, 2000

(51) Int. Cl.[7] .............................................. G06F 11/00
(52) U.S. Cl. ................ 714/4; 714/5; 711/135
(58) Field of Search .......................... 711/135; 714/5, 714/4, 42, 43

(56) References Cited

U.S. PATENT DOCUMENTS

| | | | | |
|---|---|---|---|---|
| 5,710,881 A | * | 1/1998 | Gupta et al. ................. | 709/200 |
| 5,845,326 A | * | 12/1998 | Hirayama et al. ........... | 711/135 |
| 5,958,070 A | * | 9/1999 | Stiffler .......................... | 714/13 |
| 6,122,711 A | * | 9/2000 | Mackenthun et al. ....... | 711/135 |
| 6,148,375 A | * | 11/2000 | Baylor et al. ................ | 711/130 |
| 6,151,684 A | * | 11/2000 | Alexander et al. .............. | 714/4 |
| 6,412,045 B1 | * | 6/2002 | DeKoning et al. .......... | 711/135 |

OTHER PUBLICATIONS

U.S. application Publication US2001/0013089, Weber, Pub. Date: Aug. 9, 2001.*

* cited by examiner

*Primary Examiner*—Robert Beausoliel
*Assistant Examiner*—Christopher McCarthy
(74) *Attorney, Agent, or Firm*—Gail H. Zarick, Esq.; McGinn & Gibb, PLLC

(57) ABSTRACT

A method of (and system for) recovering the state of a failed node in a distributed shared memory system, includes directing a flush of data from a failed node, and flushing the data from the failed node to a memory node.

22 Claims, 7 Drawing Sheets

METHOD AND SYSTEM FOR RECOVERY OF THE STATE OF A FAILED CPU/CACHE/MEMORY NODE IN A DISTRIBUTED SHARED MEMORY SYSTEM

BACKGROUND OF THE INVENTION

1. Field of the Invention

The present invention relates to a method and system for retrieving the state of a failed CPU, cache, and Memory node to a nonfaulty location for failure recovery purposes.

2. Description of the Related Art

Prior to the present invention, conventional systems have been unable to adequately deal with a failed computer processor, cache, or memory node.

CPU/cache nodes can fail due to permanent hardware faults, transient hardware faults, operator errors, environmental errors, and software faults. Whenever such a fault occurs in a CPU node, it can no longer participate as an operational member of the system, and the state locked in its cache hierarchy must either be retrieved or reconstructed. This process is a critical part of error recovery.

Moreover, the technology advances in cache and memory technology have recently created a new type of problem in attempting to retrieve the state that is locked in the caches of a failed CPU/cache node.

Some state-of-the-art systems utilize an L3 cache which is a new, relatively large cache (e.g., 1 Gbyte or larger). Because the L3 cache in this type of system is quite large (1 GByte or larger), a huge amount of state data is stored there at the time of any fault, and it is quite difficult to efficiently reconstruct this state with the conventional techniques.

Indeed, the conventional systems have not even addressed such a problem yet since the L3 cache is relatively new and has been incorporated only into relatively new architectures. Indeed, in the past, the conventional systems have dealt only with relatively small caches (e.g., on the order of 100 Kbytes to 1 Mbyte). Thus, when such a cache (1000 times smaller than the new L3 cache) failed, a relatively small amount of data was lost and the recovery to obtain such data was commensurately smaller (e.g., 1000 times smaller). Thus, with the new cache, a significant amount of data is lost and a significant amount of work and time is involved in attempting to recover such an L3 cache and reload it to the system.

Hereinbelow, a simplified description will be provided of the failure recovery protocol that is necessary when the present invention is not employed.

A conventional solution to failure recovery is oriented around the assumption that when a CPU/cache node fails, all of its nonvolatile state (including that in memory) is lost and must be restored from disk. To make this possible, at some prior point in time (and periodically thereafter) the application stores a full copy of its entire state on disk. Thereafter, as state updates are made during the course of normal execution, these updates are also logged to disk. Thus, the disk contains information adequate to reconstruct the state of the application up to and including the last state update.

In the event of a failure, the state of the system is reconstructed by first loading the last full copy of its state that was saved to disk, and then applying the logged state updates to bring the system state up to date.

If a shared memory processor (SMP) instance contains large amounts of memory (e.g., 64 GB or larger), then the time required to bring a copy into memory from disk and then apply the updates can be several minutes. In addition, the system state is only as recent as the last update to disk. More recent updates will have been lost since they were not logged to disk.

Thus, prior to the invention, there was no efficient and adequate way to recover a failed computer processor, cache, or memory node having a large state size.

SUMMARY OF THE INVENTION

In view of the foregoing problems, drawbacks, and disadvantages of the conventional methods, it is an object of the present invention to provide a structure and method for the rapid recovery of the state of a failed CPU/cache/memory node in a distributed shared memory system.

In a first aspect, a method of (and system for) recovering a state of a failed node in a distributed shared memory system, includes directing a flush of data from a failed node, and flushing the data from the failed node to a memory node.

In a second aspect, a system for recovering a state of a failed node in a distributed shared memory system, includes a controller for directing a flush of data from a failed node, and a flush engine for flushing the data from the failed node to a memory node.

In a third aspect, a signal-bearing medium tangibly embodying a program of machine-readable instructions executable by a digital processing apparatus to perform a method of recovering the state of a failed node in a distributed shared memory system, includes directing a flush of data from a failed node, and flushing the data from the failed node to a memory node.

With the unique and unobvious features and aspects of the invention, a method and system are provided which efficiently retrieve the state that is locked in the caches of a failed CPU/cache node, and especially a large size cache such as an L3 cache (e.g., 1 GByte or larger), such that the relatively large amount of state stored there at the time of the fault, can be efficiently reconstructed.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
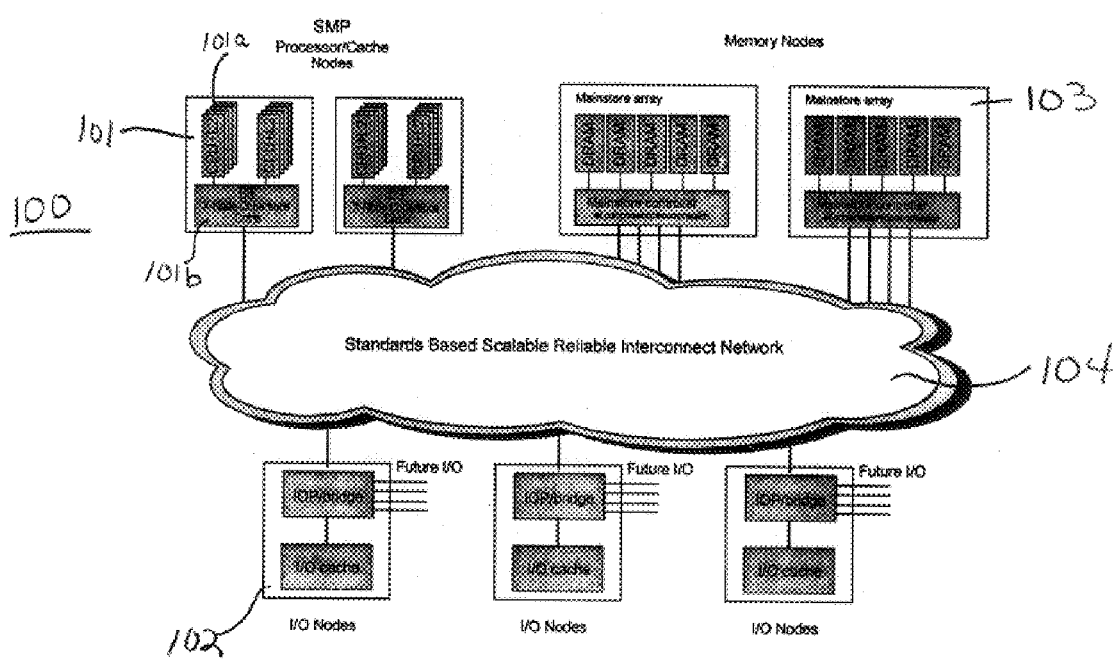
FIG. 1 illustrates an exemplary architecture 100 in which the structure and method of the present invention operate.

Referring now to the drawings, and more particularly to FIGS. 1–7, there are shown preferred embodiments of the method and structures according to the present invention.

Generally, the present invention is relevant to an environment where there are a number of CPU/cache/Memory nodes (henceforth referred to as "CPU nodes") interconnected such that each can "snoop" data from the other's cache memory, or read the other's memory directly. The physical architecture of the system is shown in FIG. 1 and described below.

Specifically, FIG. 1 shows the physical architecture (e.g., system 100) of a highly modular scalable computer architecture in which the present invention operates. This architecture is for accommodating flexible and dynamic grouping of processing, input/output (I/O), and storage resources into multiple shared memory processor (SMP) instances which themselves communicate over an interconnection fabric.

The system 100 includes central processing unit (CPU)/cache nodes 101, I/O nodes 102, and memory nodes 103 all connected via an interconnect fabric 104. These subsystems are each described below.

CPU/Cache Nodes

In FIG. 1 (and FIG. 2 which illustrates the processor nodes in greater detail), each "SMP CPU/cache Node" 101 contains multiple processors/level 2 (L2) nodes 101a, a Level 3 (L3) cache node 101b, and cache coherency and communication circuitry 101c (e.g., shown in FIG. 2) that allows the node to participate as a member of a multi-node SMP. Further, a local L3 flush engine 101d and local L3 directory 101e are included. These nodes provide the processing power of the architecture.

The architecture is flexible with respect to groupings of CPU/cache nodes into SMP instances. For example, each CPU/cache node can operate as a single instance of a symmetric multiprocessor (e.g., running one copy of an operating system), multiple CPU/cache nodes can be aggregated into a single instance of an SMP, or CPU/cache nodes can be allocated to multiple instances of a symmetric multiprocessor which communicate via the interconnect network 104 shown in FIG. 1.

The present invention is equally applicable to all such configurations mentioned above, but the preferred embodiment will be described below as applying to the case where a CPU/cache node includes a single instance of an SMP, with its recovery being orchestrated by another SMP instance.

A CPU/cache node may or may not contain significant amounts of memory (e.g., a few hundred megabytes) other than the L2/L3 caches. In the preferred embodiment of the invention, CPU/cache nodes do not contain significant amounts of memory other than the L2/L3 caches, which are relatively small high-speed memories containing frequently accessed data and instructions. Keeping this information locally in L2/L3 caches rather than remotely in memory nodes significantly speeds up access thereto, and hence overall performance. The caches are assumed to operate on a line of data, which is on the order of 128 bytes, at a time.

Hence, most memory (e.g., if the memory is 1 TB, then a 1 GB L3 cache contains 0.1% of memory, and an 8 MB L2 cache contains 0.001% memory) resides in Memory nodes, to which all nodes in the system have access. For example, an L2 cache may be 8 MByte, an L3 cache may be 1 GByte, and the memory used by a processor may be 1 TByte.

It is noted that the CPU/cache node 101 contains the Local L3 Directory 101e (e.g., see FIG. 2) that indicates which lines are held in the local L3 cache, and whether they are held in the "Modified" (e.g., also referred to as "Dirty"), "Exclusive" (also referred to as "Clean"), or "Shared" state.

If the line is held "Modified", then the local CPU/cache node has updated the line relative to all other copies in the system, which are effectively stale and must not be used. Typically, these will be the only lines which must be flushed, either locally or remotely, since the "Modified" data represents data which has been modified and not yet sent/saved to the memory node.

If the line is held "Exclusive", then the local CPU/cache node has the sole "legal" copy of the line in the system and may modify it at any time (e.g., at which time it would transition to the "Modified" state). Such modification may occur without having to notify the other nodes.

If the line is held "Shared", then the local CPU/cache node may be sharing the line with another CPU/cache, Memory, or I/O node, but cannot modify it without participating in a cache coherency protocol with the other holders of that line, which renders it "Exclusive".

Thus, not all of the data needs to be flushed. Only the "Modified" data needs to be flushed.

Figure 2:
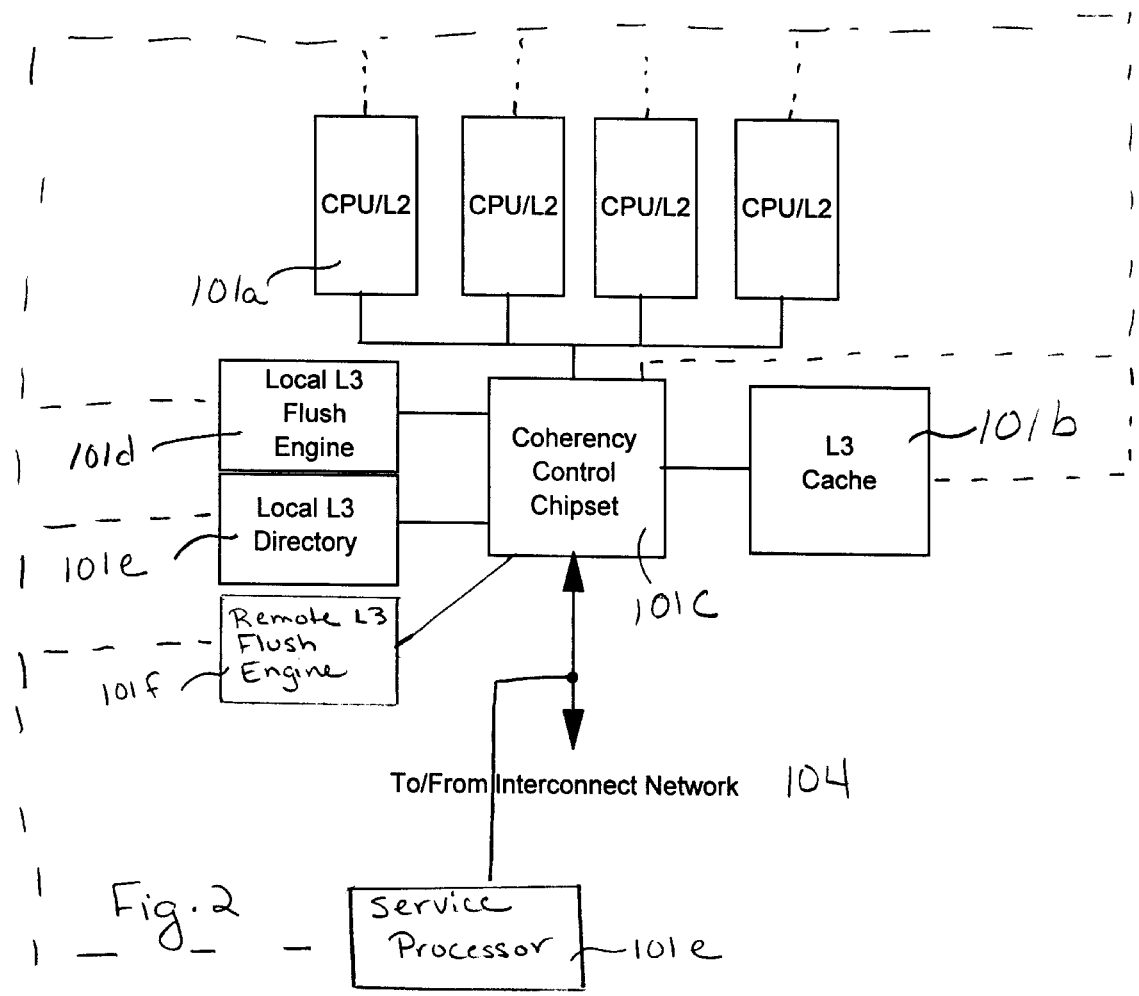
FIGS. 2 illustrates a processor node and more specifically a connection between a central processing unit (CPU/L2) node to/from a interconnect network shown in FIG. 1.

In one embodiment of the present invention, as shown in FIG. 2 and as mentioned briefly above, each CPU/cache node contains specialized circuitry called the Local Flush Engine 101d for flushing (writing) Modified or Exclusive L2 and L3 cache lines from that node over the interconnect network 104 to some other CPU/cache node 101 or Memory node 103 connected to the interconnection network 104. This circuitry 101d can be commanded to perform a flush by either the CPU/cache node 101 containing the circuitry (i.e., the local node), or by specialized circuitry (e.g., Remote L3 Flush Engine 101f) on another CPU/cache node 101 or Memory node 103 that wishes to extract the contents of the local node's L2 and L3 caches (the recovery agent).

When modified data is flushed from an L3 cache 101b, it is sent over the interconnect 104 and written to a Memory node 103, as described below.

An alternative location for the Remote Flush Engine 101f (e.g., thereby constituting an alternative embodiment of the present invention) in the memory node, as described below in regard to the Memory node.

Memory Nodes

Figure 3:
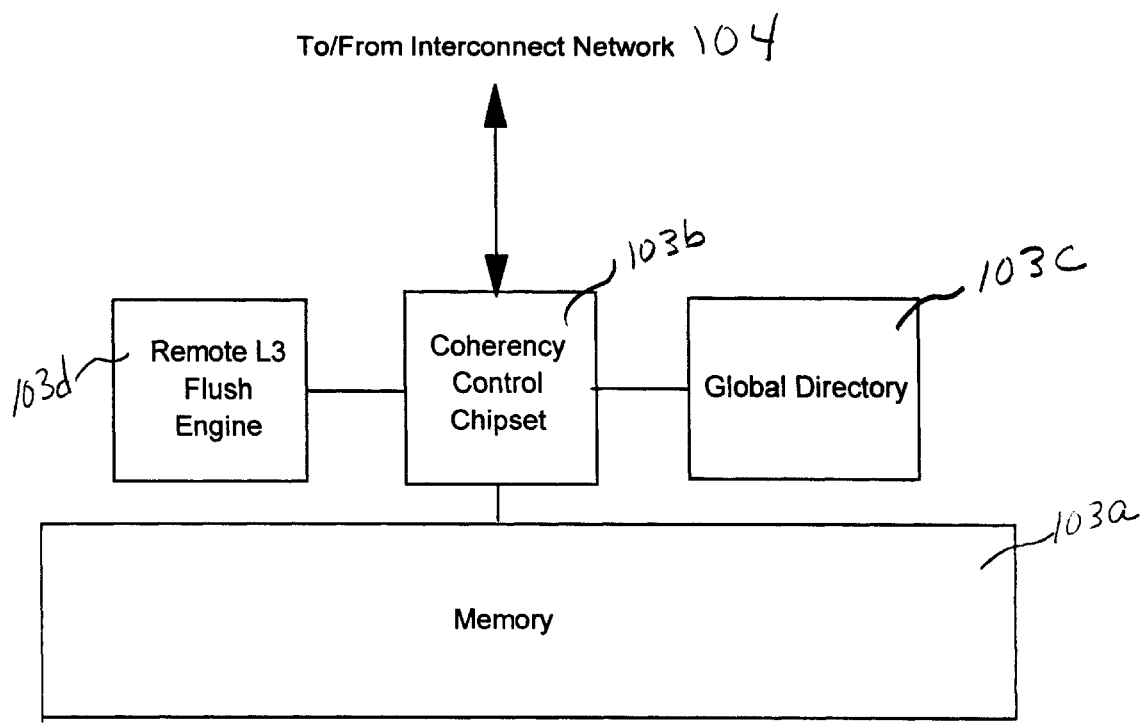
FIG. 3 illustrates a memory node and more specifically a connection between a memory node to/from the interconnect network shown in FIG. 1.
Figure 4:
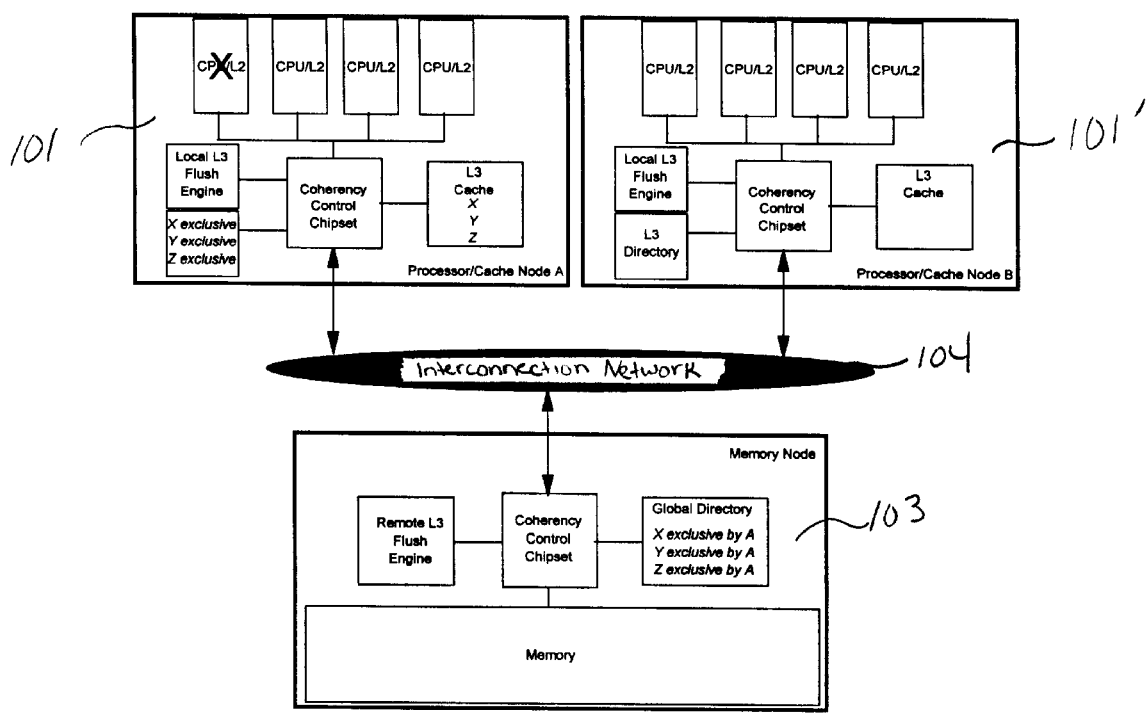
FIG. 4 illustrates a failed processor node and shows how to get data out of a cache of a failed processor node.

In the architecture 100 described above, a number of CPU/cache 101 nodes share physical memory 103a (e.g., RAM) that resides in one or more Memory nodes 103 (e.g., as shown in FIG. 1 and in greater detail in FIG. 3). A Memory node 103 may contain the memory of one or more SMP instances, each comprising one or more CPU/cache nodes 101.

The Memory node 103 is connected to the CPU/cache nodes 101, I/O nodes 102, and other Memory nodes 103 via the interconnect fabric 104. Using its coherency control chipset 103b, it participates in the cache coherency protocols necessary to keep the various copies of the lines loaned out to the various CPU/cache nodes 101 coherent and consistent. All components of the Memory node can be made reliable with respect to hardware faults and power outages by relatively straightforward encoding, replication, and power backup techniques. Thus, the memory node constitutes a stable repository of all data committed thereto.

Along with the coherency control chipset 103a, the memory node includes a Global Directory 103c that keeps track of all lines that are currently held by CPU/cache and I/O nodes. Directory 103c lists every line loaned out from the memory that is held "Exclusively" by and could possibly be modified by any given node. The information in the Global Directory 103c is useful in confirming that the L2/L3 cache of a particular node has been fully and successfully flushed.

In an alternative embodiment of the invention, as mentioned above, the Memory node 103 also contains a Remote Flush Engine 103d for generating and transmitting reads of a given set of memory locations.

As part of the normal cache coherency protocol, when any node intercepts a read of a line that is held locally in either the "Exclusive" or "Modified" state, it replies with the data from its cache, which is then written back into the Memory node 103. At this point, the Global Directory 103c is updated to indicate that the line in question is no longer held by the node in question.

I/O Nodes

Input/Output nodes 102 reside on the Interconnect network 104 and allow the CPU/cache and Memory nodes 101/103 to pass data to the environment external to the computer system via devices such as network, disk, serial communication, and parallel communication devices.

Interconnect

The CPU/cache, memory, and I/O nodes 101/103/102 are connected by the interconnect network 104 which is a high-performance interconnect network. For the purposes of the present invention, preferably the interconnect network 104 has low latency (e.g., preferably in the tens of nanoseconds), high bandwidth (e.g., preferably in the tens of GB/sec), is fault tolerant (e.g., capable of tolerating any fault and continuing operation), and it permits communication between all nodes when one of the nodes is faulty.

Normal Operation

Hereinbelow is described a simplified version of a representative cache coherence protocol used in normal operation of an SMP instance.

Under normal operation, the CPU/cache nodes 101 fetch instructions and data from the Memory node 103, execute the instructions, and write back results from the instruction execution. Any instructions or data fetched from the Memory node 103 are stored in the CPU/cache node's L2 and/or L3 caches (e.g., depending upon whether the LD cache is an inclusive cache or exclusive cache). That is, in an inclusive cache, the processor will try to fetch an instruction and will look in the L2 cache, and assuming that the instruction is not there, then the processor will look in the L3 cache. Assuming that the instruction is not in the L3 cache, then a request will be sent to memory and the line (e.g., having the instruction) is retrieved from the memory. Then, the line is installed in both the L2 and the L3 caches.

In an exclusive cache, the line is installed only in the L2 cache.

When a CPU/cache node 101 that requires a line of data does not find it in its local caches (e.g., L2 or L3), it transmits a read request for that line over the Interconnection network 104. This read request is "snooped" (e.g., received) by all CPU/caches 101 that reside in that SMP instance, as well as by the Memory node 103 containing the mainstore for that SMP instance.

If any other CPU/cache node 101 possesses the line in the "Exclusive" or "Modified" state, it demotes its ownership state to "Shared" and provides the line to the requesting CPU/cache node. The Memory node's Global Directory 103c is also updated to indicate the new state of the line.

If no CPU/cache node 101 possesses the line in the "Exclusive" or "Modified" state, the Memory node 103 takes on the responsibility of providing the line to the requesting CPU/cache node 101, and updating its Global Directory accordingly. When the CPU/cache node 101 reads a line from the Memory node 103, the node's Local L3 cache directory and the Memory node's Global Directory 103c are updated to reflect the location of any line of memory, and whether it was requested to be in the "Modified", "Exclusive", or "Shared" state.

Thus, at any given time, a CPU/cache node's caches (e.g., both L2 and L3) contain a mixture of lines in the "Exclusive", "Modified", and "Shared" state, and the CPU/cache's Local L3 Directory 101e, as well as the Memory node's Global Directory 103c, contain a record of this information. If a CPU/cache node 101 fails, then the "Exclusive" and "Modified" lines residing in its caches, of which the failed node has the sole copy, must be recovered to a nonfaulty location, such as the Memory node 103.

Recovery from Failures

The present invention exploits the fact that the preponderance of faults that occur in practice do not totally disable a CPU node 101 to the extent that it cannot participate in system-wide cache coherency protocols, or respond to data reads from another node.

For example, when a CPU node 101 suffers a software fault, the hardware is still perfectly usable and can participate in cache coherency protocols.

As another example, when the CPU fails but the remainder of the node 101 is nonfaulty, assuming the CPU failure did not disable the remainder of the node, the L3 cache is still functional and can be accessed from outside the faulty CPU node. It is believed that many transient and permanent hardware faults will in fact leave the L3 and associated circuitry operational. When this occurs, an external recovery agent can access the memory locked in the L3 and L2 caches and cause it to be forced back out to the Memory node 103. Thus, it is noted that there are generally two types of failure examples when the CPU fails. That is, there are permanent failures and transient failures. Permanent failures occur when the hardware simply "dies" (becomes inoperable) in which a physical repair must be undertaken to make the CPU operable again. Transient failures are one-time glitches or system "hiccups" in which the system dies but in which the user may merely reboot or reset the system to revive the system. As evident from the example above, a permanent failure is envisioned in which the CPU failure did not disable the rest of the node, but the L3 cache is still operable. By the same token, a transient failure may occur in which no part of the node is disabled. Transient failures are much more common than permanent failures. With transient failures, the hardware is still available and can participate in its recovery, whereas, with permanent failures, there is a good chance that a sufficient amount of the hardware still may be available to participate in the recovery.

The present invention also exploits the fact that the Memory node can be made to be reliable as outlined above, and therefore need not be reloaded from disk in the event of a CPU/cache node 101 failure. All updates to memory are stable. Moreover, if state updates are either logged into or applied directly to this stable memory, they need not be retrieved from disk and replayed. This reduces the recovery time by the time required to load the full state copy and log from disk and replay the log.

However, even with these benefits of stable memory, "Exclusive" data and "Modified" data remain locked in the cache hierarchy of the failed CPU/cache node. The invention solves this problem, as described below.

Preferred Data Recovery Method/Algorithm

Hereinbelow (and referring to FIG. 4) is described the data recovery method/algorithm according to the present invention when one SMP instance detects a node failure and controls the recovery of another node. The invention generalizes in a straightforward way to other configurations of the server architecture.

In a preferred implementation, the data recovery algorithm utilizes four subsystems: the faulted CPU/cache node 101 (in FIG. 4 designated as "Processor/Cache Node A"), another CPU/cache node 101' called a "recovery agent" (in FIG. 4, designated as "Processor/Cache Node B"), the interconnect 104, and the Memory node 103.

For illustration purposes, the faulted CPU/cache node 101 comprises one SMP instance, and the recovery agent comprises another. The description of the recovery algorithm proceeds from the point in time at which the faulted node fails and will be described with reference to the exemplary architecture shown in FIG. 4.

First, assume that at the time that CPU/cache node A fails, it contains memory locations X, Y, and Z in an "Exclusive" state. This information is known within CPU/cache node A as well as within the global directory of the Memory node 103.

Error Detection
Recovery Agent

The recovery agent (e.g., in this case CPU/cache node B) detects that the faulted node (e.g., in this case CPU/cache node A) has ceased to participate in the system operation by observing an unusual period of quiescence from the faulted node, or by observing a violation of a protocol by the faulted node.

Subsequently, the recovery agent causes the system (other CPU/cache nodes 101 and I/O nodes 102 (shown in FIG. 1) associated with the SMP instance containing the faulty CPU/cache node A) to halt operation to allow the recovery process to proceed.

In addition, if the faulted SMP instance is a part of a distributed system known as a "cluster", which possesses SMP instance-level recovery techniques, these techniques may also be invoked at this time. These functions can be accomplished by transmitting special messages over the interconnect 104 to all involved nodes.

Faulted (Failed) Node

When the faulted node has detected its own failure (e.g., in response to a non-maskable interrupt, panic, or other indicator of catastrophic failure), it can optionally flush its L2 cache down into its L3 cache as part of its failure shutdown procedure.

This flushing ensures that the L2 cache does not contain any "Exclusive" or "Modified" lines, and can be used to accelerate the process of flushing the L3 cache since subsequent snoops to these lines will not be required. This option is not necessary for correctness, however, and a faulted node that has failed to flush its L2 cache into its L3 cache can still be recovered. It is merely necessary for the L3 cache to snoop the L2 cache for any "dirty" ("Modified) lines during subsequent phases of the recovery process.

State Recovery

In the next step of the recovery protocol, the faulted node's L2/L3 caches are flushed back into the Memory node 103. Two alternatives exist for flushing the faulted node's caches back to the memory node.

In the first alternative, each CPU/cache node 101 contains specialized circuitry called the Local Flush Engine 101d (e.g., see FIGS. 2 and 4) that causes the L3 cache to flush "dirty" data.

In the second alternative, the CPU/cache node 101 contains no such extra circuitry, and the flushing is controlled by special circuitry in the Memory node 103 called the Remote Flush Engine 103d. The advantage of the second alternative is that no additional circuitry needs to be added to the CPU/cache node in order for it to participate in the data recovery protocol, and thus the cost and complexity size of the node is reduced, thereby allowing the use of industry-standard nodes not customized to take advantage of the present invention.

Initialization

The recovery agent transmits a command to the faulted node to confirm that it is able to participate in the recovery protocol. This command enters the faulted node at its interconnect port and communicates with protocol assist circuitry (not illustrated) within the local flush engine 101d, if the node has one, or the service processor 101e.

The protocol assist circuitry performs basic integrity tests on the node (i.e., ensures the L3 cache can be read), and then responds to the recovery agent.

If the response is in the affirmative, the recovery proceeds. Otherwise, a traditional recovery from disk is necessary (e.g., the "traditional" recovery being what is described above in the "Description of the Related Art" section).

Alternative 1: Local Flush Engine

When the CPU/cache node 101 possesses a local L3 flush engine 101d, the local flush engine 101d traverses the node's Local L3 Directory 101e and flushes every line from the L3 cache that is marked "Exclusive" or "Modified". These lines are sent out the interconnect port and are written to the Memory node 103, and the Memory node's Global Directory 103c is updated to reflect that the line is now no longer owned by the faulted node.

If a more recent copy of a line may reside in the node's L2 cache, as indicated by the Local L3 Directory 101e, the L2 cache is snooped and the updated line is retrieved prior to being transmitted back to the Memory node 103. When all of the "Exclusive" or "Modified" lines have been written back, the recovery is complete.

Thus, in the above example when the faulted node contains X, Y, and Z in the "Exclusive" state, the Local Flush Engine 101d writes X, Y, and Z back to the Memory node 103. If at any point the local flush engine encounters an uncorrectable error (e.g., the L2 cache has a "dirty" line that cannot be snooped due to a failure in the CPU itself, or an L3 cache read encounters an uncorrectable error), a modified traditional recovery from stable storage is performed (as discussed below).

Alternative 2: Remote Flush Engine

When the flushing is to be controlled by the Remote Flush Engine 103d in the Memory node 103, the recovery agent commands the Memory node 103 to begin the flush process.

The Remote Flush Engine 103d traverses the Global L3 Directory 103c and issues a Read for every line that is held "Exclusive" or "Modified" by the faulted node. These Reads will cause the faulted node's snoop circuitry (e.g., the snoop circuitry is believed to be well known in the art and, for brevity, will not be described further herein) to write back the line to the Memory node 103 and update its Local L3 Directory 101e, thereby to indicate that it no longer owns the line.

When the line arrives back at the Memory node 103, the Memory node 103 updates its Global L3 Directory 103c to indicate that the faulted node no longer owns the line, and moves on to the next Global L3 Directory entry that is owned by the faulted node.

In the example where the faulted node contains X, Y, and Z, the Remote L3 Flush Engine 103d transmits reads of lines X, Y, and Z into the interconnection network 104. The faulted node's cache coherency circuitry snoops these reads and provides the values of X, Y, and Z back to the requesting Memory node 103.

If the Remote Flush Engine 103d is able to flush all "dirty" lines owned by the faulted node in this manner, then the recovery has been successful. Otherwise, a modified traditional recovery from stable storage is required.

It is noted that a main difference between the local flush and the remote flush is who (e.g., the agent) is directing the data flush. The data to be read in either case is the same. Thus, after the flush is directed, either by the cache node or by the memory node, the actual flush operation is substantially the same in both cases. Hence, for example, the cache control circuitry on the faulted node will receive, from the either the local flush engine of the failed node or the remote flush engine of the memory node, a message which indicates "Disgorge Line 1" and the circuitiy will write back Line 1 to memory. This writing back operation is the same in either a remote flush or a local flush.

Modified Traditional Recovery from Stable Storage

There may be scenarios in which the effects of the fault will be so severe that the "Exclusive" and "Modified" data resident in the faulted node's L3 cache cannot be fully retrieved. Because it has a list of all lines that are held by the faulted node, the Remote L3 Flush Engine 103*d* will be able to detect this and, furthermore, will be able to detect which lines could not be recovered from the faulty node.

Thus, the regions of memory that cannot be retrieved can be clearly identified and must be recovered from stable storage, which can be disk or the Memory node 103. This may require that the atomic operation (e.g., a transaction) in progress at the time of the fault may have to be aborted, backed out, and retried.

If the amount of unrecoverable data is small, then this modified recovery strategy will complete in less time than a full recovery from disk because the unrecoverable data can be strictly circumscribed and limited recovery techniques used as opposed to having to assume that all of the memory must be recovered.

Figure 5:
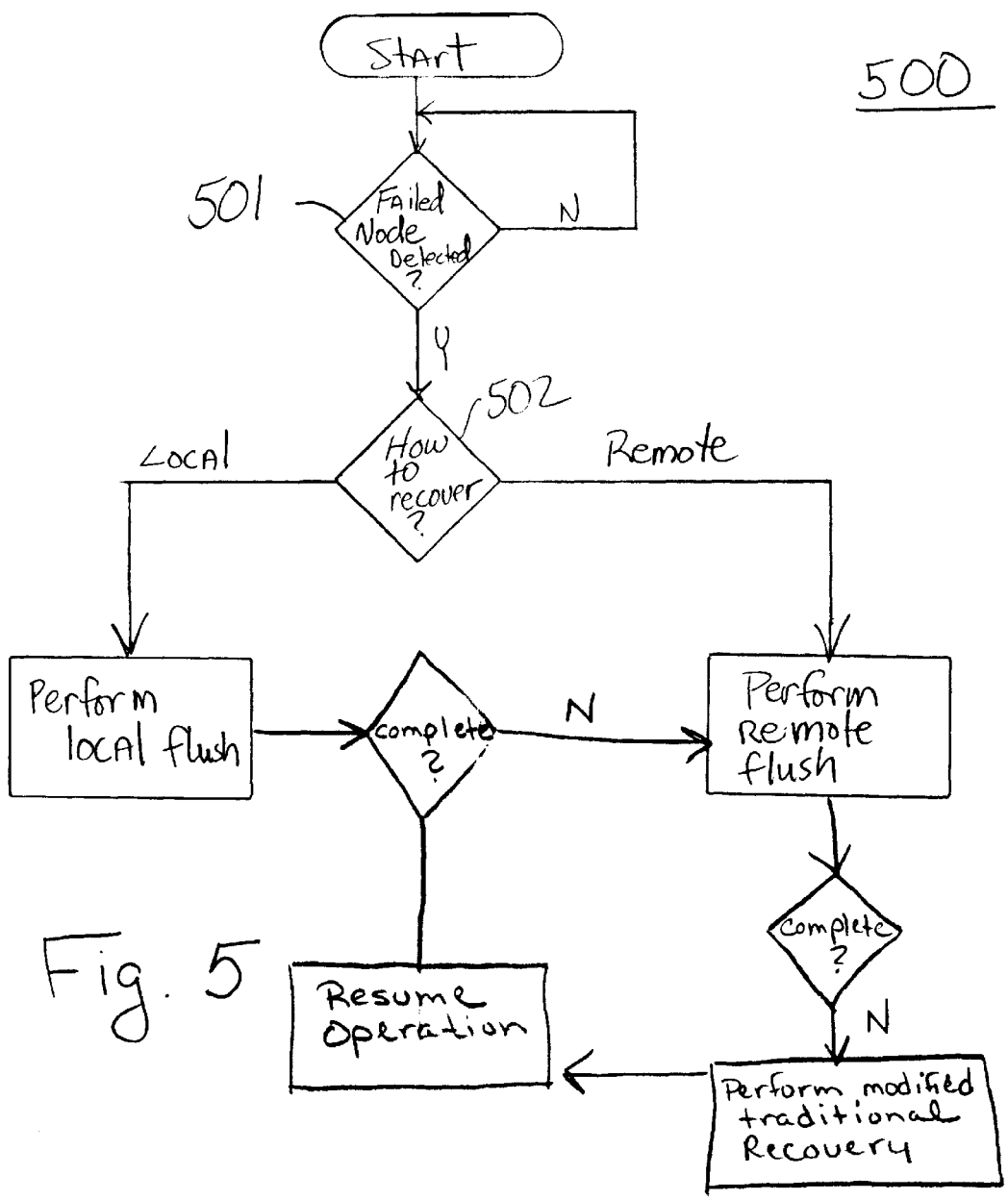
FIG. 5 illustrates a method 500 of data and error recovery in a failed node according to the present invention.

FIG. 5 illustrates a flowchart of the method 500 of the present invention of data and error recovery according to the present invention.

First, in step 501, it is determined whether a failed CPU/cache node is detected. If no, the process continues looping until a failed node is in fact detected.

In step 502, upon detection of a failed CPU/cache node, it is determined how to recover (e.g., is it to be a local recovery or a remote recovery). If a local flush is to be performed (e.g., when speed is desired or the faulted node can control its own flush), then step 503 is performed (e.g., the operation described above). If a remote flush is to be performed (e.g., when reliability is desired or the faulted node cannot control its own flush), then step 504 is performed (e.g., the operation described above).

Figure 6:
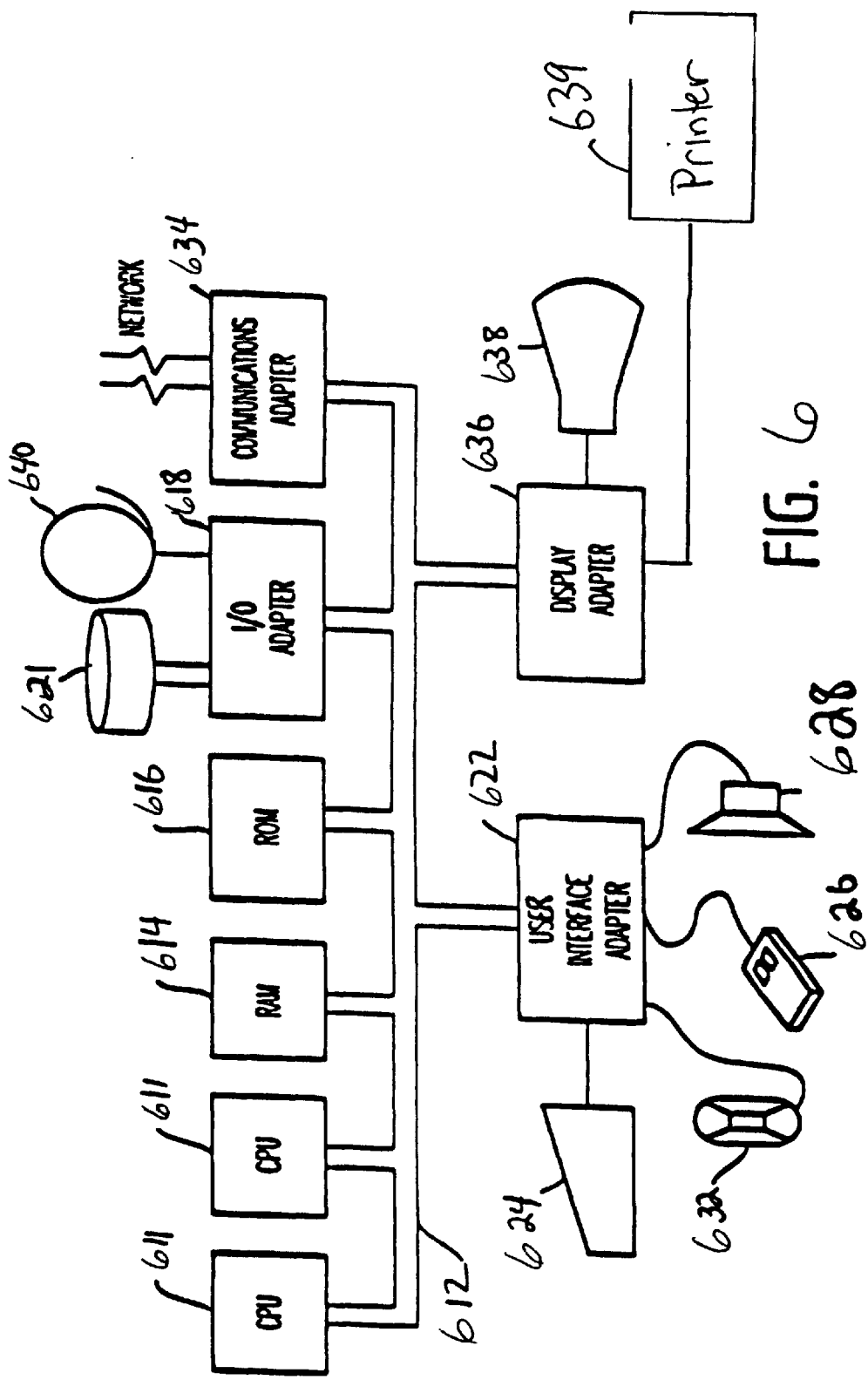
FIG. 6 illustrates an exemplary hardware/information handling system 600 for incorporating the present invention therein.
Figure 7:
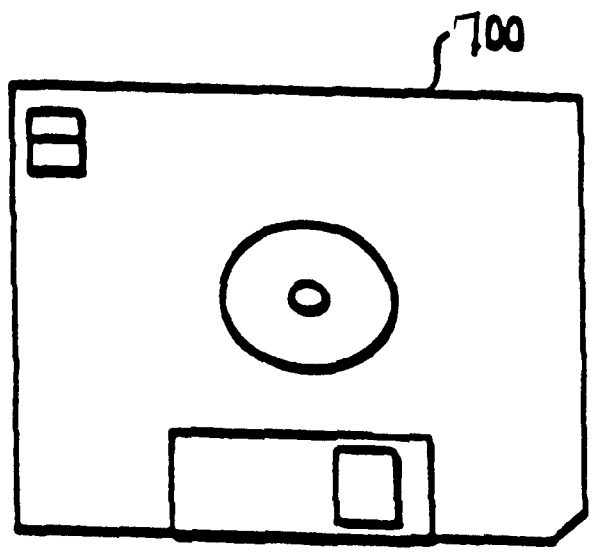
FIG. 7 illustrates a signal bearing medium 700 (e.g., storage medium) for storing steps of a program of the method according to the present invention.

FIG. 6 illustrates a typical hardware configuration of an information handling/computer system for use with the invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or a printer (e.g., a digital printer) 639.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 611, as represented by the fast-access storage for example. Alternatively, the instructions may be contained in another signal-bearing media, such as a magnetic data storage diskette 700 (FIG. 7), directly or indirectly accessible by the CPU 611.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious features and aspects of the invention, a method and system are provided which efficiently retrieves the state that is locked in the caches of a failed CPU/cache node, and especially a large size cache such as an L3 cache (e.g., 1 GByte or larger), such that the relatively large amount of state stored there at the time of the fault, can be efficiently reconstructed.

That is, the invention provides an augmentation to the coherency control mechanism to salvage the data in a failed node CPU/cache node.

While the invention has been described in terms of several preferred embodiments, those skilled in the art will recognize that the invention can be practiced with modification within the spirit and scope of the appended claims.

For example, it is noted that while the exemplary embodiments above have been primarily applied to an L3 cache, other relative cache sizes may be accommodated and indeed the present invention may be applied to other memory products which rely on larger L2 caches.

It is noted that the above-described first and second alternatives could be employed in combination in sequence. Thus, for example, the first alternative could be tried first (e.g., performing a local flush first), and then if the first alternative fails (e.g., does not result in recovery), the second alternative of performing a remote flushing could be performed. The local flush is faster since the data will be literally poured out of the node. Since the local flush is faster, this may be more advantageous if speed is important. However, the local flush is not as reliable/stable as the remote memory flush, since the local node has in fact failed. Hence, a global remote flush may get all of the data but is typically slower since the memory node must launch an address and "walk" its way through the cache line-by-line.

It is noted that the invention can be implemented in a combination of hardware and software.

For example, the software error detection method can be implemented in software and would detect an error in, for example, Node A and would indicate that Node A has failed and would then send a quiesce command to nodes B, C, and D. Software in nodes B, C, and D would respond to the quiesce command and any of the nodes could send a message to Node A for Node A to begin its flush. Alternatively, the other nodes could send a message to the memory node to direct a remote flush. Then, hardware could take over the operation.

It is noted that the specific hardware circuitry (e.g., gates, switches, etc.) are well-known to those of ordinary skill in the art and thus, for brevity, such circuitry has not been described in detail herein.

Having thus described my invention, what I claim as new and desire to secure by Letters Patent is as follows:

1. A method of recovering the state of a failed node in a distributed shared memory system, comprising:

directing a flush of data from a failed node; and flushing said data from said failed node to a memory node, wherein said flushing includes performing a local flush on said failed node followed by a remote flush.

2. The method of claim 1, further comprising:

determining whether said flushing is complete.

3. The method of claim 2, wherein said determining includes:

determining all lines having a "Modified" status on said failed node; and examining a directory of said memory node and ensuring that said all lines having said "Modified" status on said failed node have been written back to said memory node.

4. The method of claim 1, wherein said flushing comprises:

locally flushing data from said failed node.

5. The method of claim 1, wherein said flushing comprises:

remotely flushing said data from said failed node.

6. The method of claim 1, further comprising:

detecting a failed node.

7. The method of claim 1, wherein said flushing is performed line-by-line.

8. The method of claim 1, wherein said flushing is performed in a single burst.

9. The method of claim 1, wherein said remote flush is directed by said memory node.

10. A system for recovering a state of a failed node in a distributed shared memory system, comprising:

a controller for directing a flush of data from a failed node; and a flush engine for flushing said data from said failed node to a memory node, wherein said flush engine includes a local flush engine for performing a local flush on said failed node and a remote flush engine for performing, after said local flush a remote flush.

11. The system of claim 10, further comprising:

a judging unit for determining whether said flushing is complete.

12. The system of claim 11, wherein said judging unit includes:

a first unit for determining all lines having a "Modified" status on said failed node; and a second unit for examining a directory of said memory node and ensuring that said all lines having said "Modified" status on said failed node have been written back to said memory node.

13. The system of claim 10, wherein said flush engine includes a local flush engine for locally flushing said data from said failed node.

14. The system of claim 10, wherein said flush engine includes a remote flush engine for remotely flushing said data from said failed node.

15. The system of claim 10, further comprising:

a detector for detecting a failed node.

16. The system of claim 10, wherein said flushing is performed line-by-line.

17. The system of claim 10, wherein said flushing is performed in a single burst.

18. The system of claim 10, wherein said remote flush is directed by said memory node.

19. A system for recovering a state of a failed node in a distributed shared memory system, comprising:

means for directing a flush of data from a failed node; and means for flushing said data from said failed node to a memory node, wherein said flushing means includes a local flush engine for performing a local flush on said failed node and a remote flush engine for performing, after said local flush, a remote flush.

20. A signal-bearing medium tangibly embodying a program of machine-readable instructions executable by a digital processing apparatus to perform a method of recovering the state of a failed node in a distributed shared memory system, comprising:

directing a flush of data from a failed node; and flushing said data from said failed node to a memory node, wherein said flushing includes performing a local flush on said failed node followed by a remote flush.

21. The system of claim 19, wherein said remote flush is directed by said memory node.

22. The signal-bearing medium of claim 20, wherein said remote flush is directed by said memory node.

* * * * *